United States Patent [19]

Ruehr

[11] Patent Number: 4,701,742
[45] Date of Patent: Oct. 20, 1987

[54] PNEUMATIC PRESSURE SWITCH FOR TIRE PRESSURE MONITOR

[75] Inventor: Volker Ruehr, Leinfelden-Echterdingen, Fed. Rep. of Germany

[73] Assignee: Dr. Ing. h.c.F. Porsche Aktiengesellschaft, Stuttgart, Fed. Rep. of Germany

[21] Appl. No.: 835,380

[22] Filed: Mar. 3, 1986

[30] Foreign Application Priority Data

Mar. 1, 1985 [DE] Fed. Rep. of Germany ....... 3507253

[51] Int. Cl.[4] ............................................. B60C 23/00
[52] U.S. Cl. ....................................... 340/58; 340/60; 340/614; 340/626; 200/61.22; 200/83 R; 116/34 R; 73/146.5; 73/717
[58] Field of Search ................. 340/58, 52 C, 60, 614, 340/626; 200/61.22–61.26, 83 R, 83 A, 83 Y; 116/34 A, 34 B, 34 R; 73/146.5, 146.8, 717, 723

[56] References Cited

U.S. PATENT DOCUMENTS 3,760,350  9/1973  Johnson .................................. 340/58
4,131,876  12/1978  Dees, Sr. et al. ...................... 340/58
4,348,654  9/1982  Matsuda et al. ....................... 340/58

FOREIGN PATENT DOCUMENTS 2832447  2/1980  Fed. Rep. of Germany .

OTHER PUBLICATIONS

Research Report TV 7672, Federal Adminstry for Research and Technology, "Tire Characteristics and Driving Safety; Project Area I, Air Pressure Control System", R. Weber et al., Porsche AG, pp. 107–124, Dec. 1980.

Primary Examiner—Donnie L. Crosland
Attorney, Agent, or Firm—Barnes & Thornburg

[57] ABSTRACT

A pneumatically operated pressure switch for monitoring the air pressure in a tire is provided with a second switch in its housing capsule. The second switch is connected to an oscillating circuit. This second switch changes the oscillating circuit upon sensing a change in the gas pressure in the reference pressure chamber. This leads to an error indication to the driver, and thereby provides a self-monitoring pressure switch for monitoring the air pressure in a tire.

29 Claims, 11 Drawing Figures

PNEUMATIC PRESSURE SWITCH FOR TIRE PRESSURE MONITOR

BACKGROUND AND SUMMARY OF THE INVENTION

This invention relates to a pneumatically operated pressure switch for monitoring the air pressure in a tire. The switch includes a housing capsule open towards the interior of the tire and is insertable into a corresponding opening of a vehicle rim. The housing capsule includes an electrically conducting first switching membrane exposed to the tire pressure; a reference pressure chamber filled with gas and sealed off from the tire by the first switching membrane; a first switching contact which can cooperate with the first switching membrane to provide a conductive closed path; and an oscillating circuit in series with the first switching contact and the first switching membrane.

The filling medium of a vehicle tire is exposed to substantial temperature fluctuations due to continually changing environmental conditions, friction and flexing forces. Pneumatically operated pressure switches of the above-described type which are used for monitoring a pressure or a pressure limiting value of a filling medium need to be provided with a temperature compensating means.

For this reason, DE-OS 28 32 447 provides a reference pressure chamber with such pressure switches. The pressure switch is located in a housing which is pneumatically isolated from the interior of the vehicle tire by means of a membrane. The membrane cooperates with a switching contact insulatingly carried in the housing, and protrudes into the center of the reference pressure chamber with respect to the switching contact. The cooperation of the membrane and the switching contact serves to connect or close a signal transmitting circuit. The reference pressure chamber is filled with pressurized gas. The pressure of the gas is chosen such that the membrane, when the correct pressure of the filling medium of the vehicle tire is provided, rests against the switching contact and lifts up as the pressure of the filling medium decreases. Since the reference pressure chamber and the vehicle tire are subjected to the same temperature on opposite sides of the membrane, the membrane switch is temperature balanced.

However, a disadvantage with such pressure switches is that the sealing capacity of the reference pressure chamber, and as a result the stability of the pressure of the gas over a long period of time such as, for example, the normal life expectancy of a vehicle, is not guaranteed. Because of the unavoidable leakages which can occur due to, for example, material weakening or gas diffusion, this pressure may drop substantially below its nominal value even after a relatively short operational period. An inaccurate tire pressure will no longer be noticeable and may lead to dangerous situations during the operation of the vehicle since the driver relies upon the system. Furthermore, it is very difficult to test the correct functioning of the pressure switch since the pressure in the reference pressure chamber cannot be directly measured.

It is therefore an objective of the present invention to provide a pneumatically operated pressure switch for monitoring the tire pressure which is itself monitored continuously as to its correct functioning during the operation of the vehicle, and yet is simple in construction, and capable of being produced cost-efficiently.

These and other objectives are attained by the present invention by providing a pneumatically operated pressure switch in the housing capsule with a second switching means for sensing a change in the reference pressure chamber and which is connected to the oscillating circuit for changing the oscillating circuit upon sensing a change of gas pressure in the reference pressure chamber.

The advantages provided by preferred embodiment of the present invention are primarily that a pressure switch for monitoring the tire pressure is provided which, during the operation of a vehicle equipped with the invention, is monitored continuously regarding a correct pressure in its reference pressure chamber and thereby its functional accuracy. Furthermore, the invention is of simple constructional design and as a result is sturdy and can be manufactured both easily and cost-efficiently.

Further objects, features and advantages of the present invention will become more apparent from the following description when taken with the accompanying drawings, which show for purposes of illustration only, embodiments constructed in accordance with the present invention.

DETAILED DESCRIPTION OF THE DRAWINGS

Figure 1:
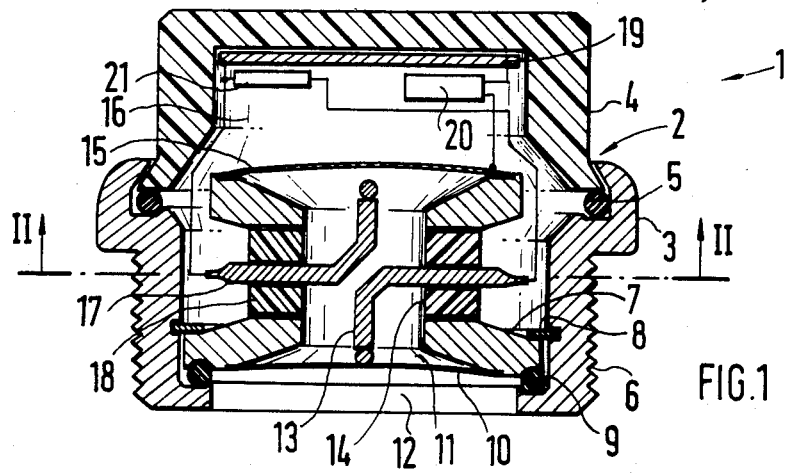
FIG. 1 is a sectional view through a pneumatically operated pressure switch constructed in accordance with a preferred embodiment of the present invention.

In FIG. 1, a pneumatically operated pressure switch for monitoring the pressure of motor vehicle tires has the reference numeral 1. The housing capsule 2 of the pressure switch 1 is comprised of a base housing 3 and a cap or lid 4. Between the base housing 3 and the cap 4 is clamped a first sealing ring 5, which in preferred embodiments, is made out of elastic material, and seals off the housing capsule 2 from the outside. The base housing 3 is provided with screw threading 6 and is screwed into the rim of a motor vehicle wheel. In preferred embodiments of the present invention, the base housing 3 is manufactured from metal (aluminum, for example), and the cap 4 produced out of synthetic resin (polyamide, for example). The cap 4 is attached to the base housing 3 in a form- and/or press-fitted manner by means of screw fitting, flanging or any other suitable means for press-fitting or form-fitting attachment.

A switch housing 7 is arranged in the housing capsule 2 and is tightly pressed against a second securing ring 9 made out of elastic material by means of a securing ring 8 in the base housing 3. A first switching membrane 10 is fastened in a ring-shaped manner at the switch housing 7. This first switching membrane 10 seals off a reference pressure chamber 11 with respect to the interior of a motor vehicle tire, i.e., with respect to its filling medium. The filling medium is in fluid communication with the first switching membrane 10 through an opening 12 in the base housing 3.

The reference pressure chamber 11 is filled with a gas under pressure. This reference pressure is chosen such that when there is a sufficient (or higher) pressure of the filling medium in the vehicle tire, the first switch membrane 10 just contacts a first switching contact 13, and will lift off this first switching contact 13 as the pressure of the filling medium decreases. The first switching contact 13 is obliquely bent and is guided and embedded in a gas-tight, electrically insulated first duct 14 arranged in one side, and protruding out of, the switch housing 7.

In order to monitor the reference pressure, the switch housing 7 is pneumatically isolated from an interior space 16 of the housing capsule 2 by a second switching membrane 15 at the end opposite the first switching membrane 10. The interior space 16 is preferably under atmospheric or ambient air pressure. The second switching membrane 15 is fastened in a ring-shaped manner at the switch housing 7, and with a correct reference pressure does not contact a second switching contact 17. However, if the reference pressure decreases only slightly, the second switching membrane 15 comes into contact with the second switching contact 17. This second switching contact 17 is also obliquely bent and embedded into a gas-tight and electrically insulated second duct 18 at the side opposite to the first duct 14.

At least one of the switching contacts 13, 17 and/or at least one of the switching membranes 10, 15 may be equipped with adjustment devices, not shown, that allow adjustment of the switching values at which the switching membranes 10, 15 are lifted off or lowered upon the switching contacts 13, 17.

The switching values may also be regulated by the pressure in the reference pressure chamber 11, and/or by pre-stressing the switching membrane 10 and/or 15 during welding of the membrane to the switch housing 7. The switching values can also be regulated by a plastical deformation of the switching membranes 10 and/or 15 or the switching contacts 13 and/or 17. The second switching contact 17 may also be adjusted by increasing the pressure in the housing capsule 2.

Figure 2:
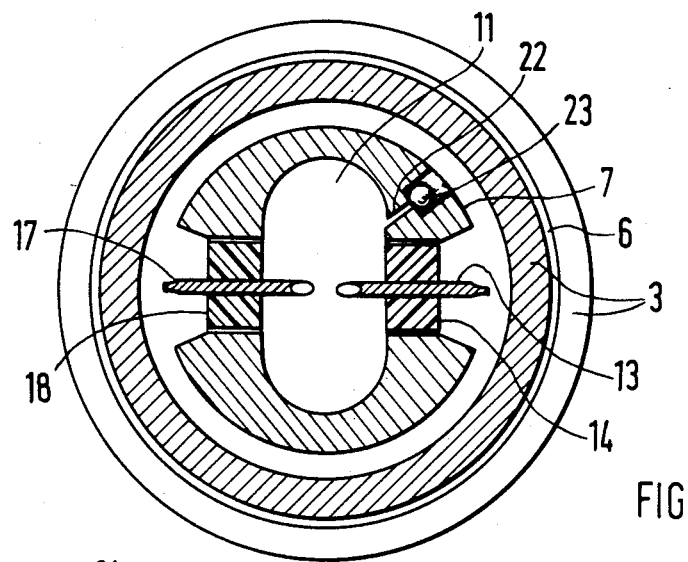
FIG. 2 is a sectional view taken along line II—II of FIG. 1.

FIG. 2 shows a cross-section of the pressure switch 1 of the embodiment of FIG. 1 in the plane of the switching contacts 13 and 17. The base housing 3 with screw threading 6, and the switch housing 7 having a reference pressure chamber 11 exhibiting an oval shape in this view, as well as the ducts 14 and 18 with their respective switching contacts 13 and 17, are shown here in this figure.

The reference pressure chamber 11 includes a filler opening 22 that is closed in a preferred embodiment by means of a gas-tight roll 23 pressed into the filler opening 22, or in another preferred embodiment, not illustrated, by a valve. The filling of the reference pressure chamber with gas to the necessary reference pressure makes the adjustment of the pressure switches to the desired pressure of tires for different vehicles possible.

The electrical components of the pressure switch wirelessly transmit measuring signals to an evaluating and indicating electronic unit (not shown). The electric components including inductor 19, capacitor 20 and resistor 21 are housed in the cap 4 and are secured by welding or plugging into the cap 4. The component parts are connected by electrical lines to the switching elements 13, 15, 17 and the membranes 10 and 15 are connected by the conductive housing 7.

The schematic electrical flow diagrams of FIGS. 3 through 6 show a pressure sensitive oscillator circuit including inductor 19, capacitor 20 and resistor 21 with switching contacts 13, 17 and switching membranes 10, 15 serving as the switches, in various switching conditions. The electrical coil 19 can be constructed as a compressed, flat coil or as a wrapped coil containing a ferrite core.

Depending upon the condition of the switches, the oscillator circuitry is a) deactivated, b) is activated and includes inductor 19, capacitor 20, and resistor 21 or c) activated and includes inductor 19 and capacitor 20. Prior art circuits generally include a single switching contact 13 and switching membrane 10 to activate or deactivate an oscillator circuit including inductor 19, capacitor 20 and resistor 21. These are described in DE-OS 28 54 199 and in the Research Report TV 7672 of the Federal Adminstry For Research and Technology "Tire Characteristics And Driving Safety; Project Area I, Air Pressure Control System" by R. Weber et al. of the Dr. Ing. h.c.F. Porsche Aktiengesellschaft, on pages 107 et seq.

The first switching contact 13 and the first switching membrane 10 are symbolically shown by the first switch 24, while the second switching contact 17 and the second switching membrane 15 are shown as the second switch 25. An open switch corresponds to the condition of the switching membrane being out of contact with the switching contact.

Figures 3, 5:
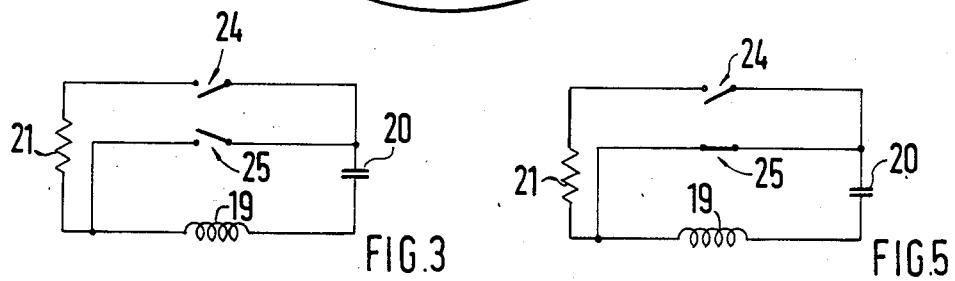
FIGS. 3 through 6 are schematic electrical flow diagrams that show four possible switching states of the preferred embodiment illustrated in FIG. 1.

FIG. 3 shows both switches open, indicating that the tire pressure is too low and the reference pressure is correct. As a result the oscillating circuit is open, so that a field inductively coupled into coil 19 will be unaffected by the oscillating circuit. This leads to an error indication.

Figures 4, 6:
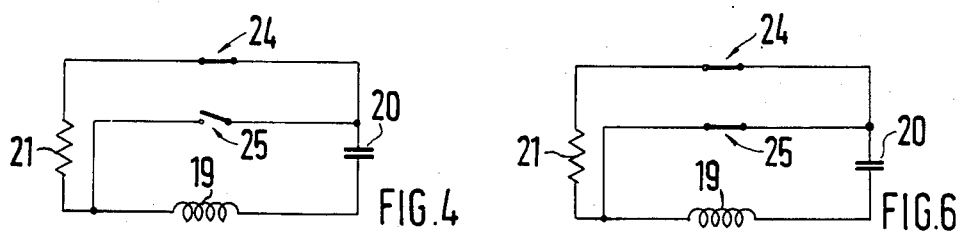

In accordance with FIG. 4, the first switch 24 is closed and the second switch 25 is open, indicating that both the reference and tire pressures are correct. The oscillating circuit is dampened by means of resistor 21 which is now part of the oscillating circuit. This results in a dampening circuit which substantially weakens the field coupled into coil 19, and does not result in an error indication.

An opened first switch 24 and a closed second switch 25 (FIG. 5) produces the same result as a closed first switch 24 and a closed second switch 25 (FIG. 6) when the reference pressure is too low, indicating a defective pressure switch 1. In the diagram of FIG. 5, the tire pressure is also too low, as switch 24 is open. In both FIGS. 5 and 6 the resistor 21 is bridged by closed switch 25, so that the undampened oscillator leads to a resonance excitation and thereby a strengthening of the field coupled into coil 19 which will trigger an error indicator.

Consequently, two distinct error indications are given. If the field coupled into coil 19 either remains unaffected the tire pressure is low or if the field is strengthened the reference chamber pressure is low. A contemplated preferred embodiment includes an indicating means which could signal an error in the pressure switch when the field coupled into coil 19 is strengthened as well as unaffected.

Figure 7:
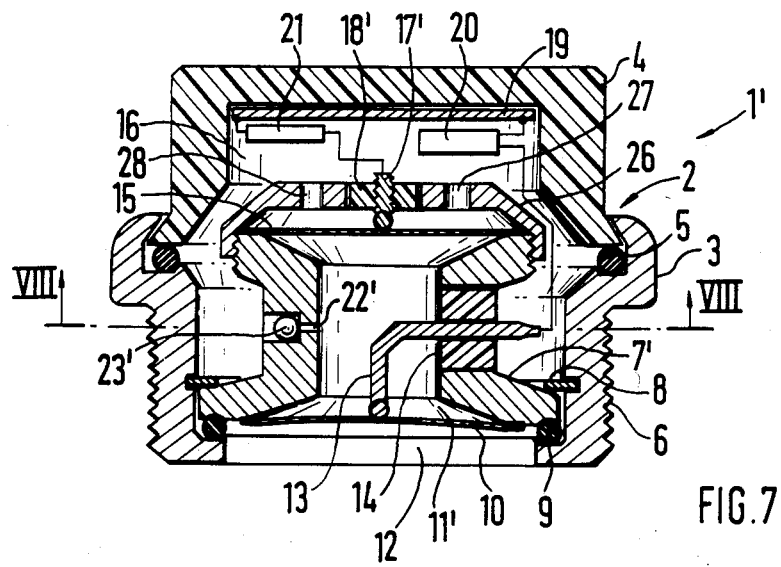
FIG. 7 is a sectional view similar to FIG. 1 showing another preferred embodiment of the present invention.
Figure 8:
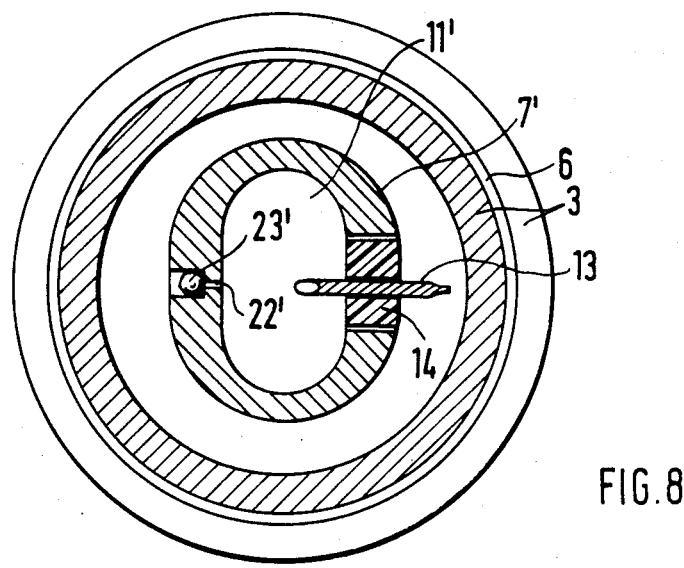
FIG. 8 is a sectional view taken along line VIII—VIII of FIG. 7.
Figure 9:
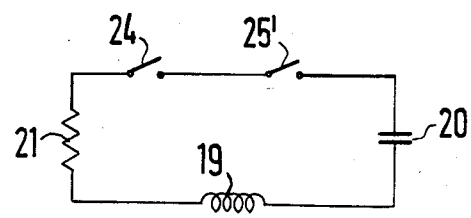
FIG. 9 is a schematic electrical flow diagram of the preferred embodiment of the present invetion illustrated in FIG. 7.

In another preferred embodiment of the pneumatically operated pressure switch 1' shown in FIGS. 7, 8 and the schematic flow diagram of FIG. 9, those parts identical to the parts illustrated in FIG. 1 are provided with the same reference numerals, while parts which are only functionally equivalent are provided with a prime.

A second switching contact 17' contacts the second switching membrane 15 in this preferred embodiment not from the interior of the reference pressure chamber 11', but from the outside by means of a bridge 26 fixedly attached on the switch housing 7'. In a preferred embodiment, the bridge 26 is screwed together to the switch housing 7', but further embodiments contemplate other methods of connecting the bridge 26 and the switch housing 7' in a form- and/or press-fitted manner. In order for the switching membrane 15 to be exposed to the pressure in the housing capsule 2, the bridge 26 is provided with one or several bores 27, 28.

The second switching contact 17' is embedded or screwed into an electrically insulated second duct 18'. In a preferred embodiment, a filler opening 22' can be provided with a gas-tight, pressed-in roll 23'; alternatively, a valve could be provided at the same location where the second switching contact 17 is inserted into the switch housing 7 of the pressure switch 1 of FIG. 1. The two switching elements 24 and 25' respectively formed by the first switching membrane 10 and the first switching contact 13, and the second switching membrane 15 and the second switching contact 17', no longer influence the oscillator separately, but are switched in series as can be seen from FIG. 9. An error message is produced whenever at least one of the switching membranes 10 or 15 lifts off its respective switching contact 13 or 17', which will occur, whenever either the tire pressure or the pressure in the reference pressure chamber 11 or both have dropped to below their desired value.

This arrangement no longer provides for a selective error detection. However, the adjustment of the pressure switch is made substantially easier, since the switching point of the first switching membrane 10 is regulated by the pressure in the reference pressure chamber 11', while the switching point of the second switching membrane 15 is obtained by adjusting, by rotation the screwed-on bridge 26 or the second switching contact 17' screwed into duct 18'.

The utilization of this system for monitoring the reference pressure chamber is not limited to signal transmitting systems operating on the basis of a dampening oscillating circuit, it may also be used with other active and passive signal transmitting systems.

Figure 10:
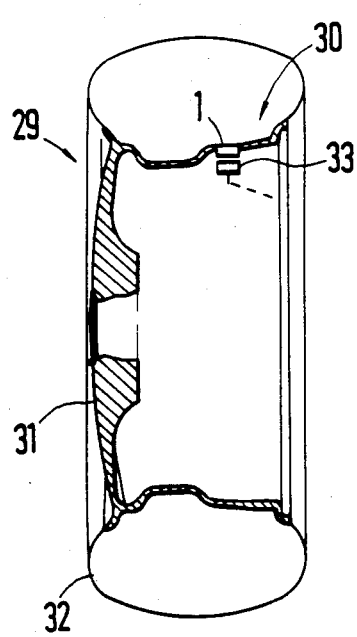
FIGS. 10 and 11 are two separate mounting arrangements of the preferred embodiments of the present invention at a vehicle wheel.
Figure 11:
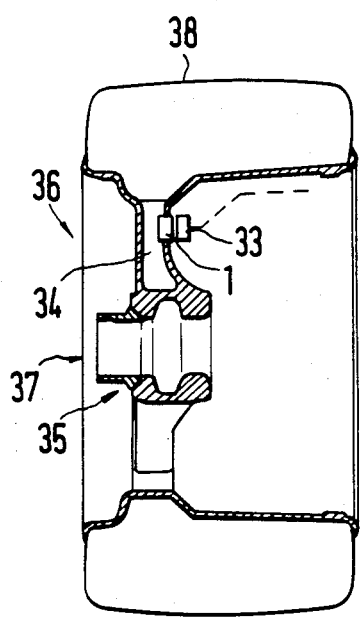

FIGS. 10 and 11 show alternate mounting arrangements of a pressure switch constructed in accordance with a preferred embodiment of the present invention. In FIG. 10, for example, the pressure switch 1 is connected to a conventional rim of a motor vehicle wheel. In FIG. 11, the pressure switch 1 is mounted in a wheel rim having a central closing and spoke-like, hollow carrier elements open with respect to the interior of the tire, the carrier elements being located between a rim bed and the central closure.

The pressure switch 1 in the motor vehicle wheel 29 shown in FIG. 10 is arranged in a rim bed 30 of the wheel rim 31, thereby exposing it to the pressure of the filling medium of the tire 32. A coupling element 33 which is arranged, for example, upon a wheel carrier, not shown, transmits the field coupled into coil 19 and monitors its signal strength as the element 33 passes pressure switch 1 once per wheel rotation.

The pressure switch 1; mounted as shown in FIG. 11, is arranged in a spoke-like hollow space 34 of a wheel rim 35. In this arrangement, the motor vehicle wheel 36 is connected by means of a central closure 37 to a wheel carrier, not shown. The spoke-like hollow space 34 is open with respect to the vehicle tire 38, allowing the pressure switch 1 to measure the interior pressure of the tire. The coupling element 33 is again fixedly attached to the wheel carrier not shown here, in a suitable manner.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. A pneumatically operated pressure switch for monitoring the air pressure in a tire including a housing capsule open towards the interior of the tire and insertable into a corresponding opening of a vehicle rim, the housing capsule including an electrically conducting first switching membrane exposed to the tire pressure, a reference pressure chamber filled with gas and sealed off from said tire by said first switching membrane, a first switching contact which can cooperate with the first switching membrane to provide a conductive closed path, and including an oscillating circuit in series with the first switching contact and the first switching membrane, wherein said pneumatically operated pressure switch further includes:
    a second switching means in said housing capsule for sensing a change in gas pressure in said reference pressure chamber and connected to said oscillating circuit for changing said oscillating circuit upon sensing said change of gas pressure in said reference pressure chamber.

2. The switch of claim 1, wherein said second switching means includes an electrically conducting second switching membrane which pneumatically isolates said reference pressure chamber from said interior space of said housing capsule, and a second switching contact which cooperates with said second switching membrane to form a conductive closed path.

3. The switch of claim 2, wherein said oscillating circuit includes a resistor means, and said second switching means is connected in parallel to said resistor means for bridging said resistor when said second switching means is closed to increase the frequency of said oscillating circuit.

4. The switch of claim 2, wherein said second switching contact is electrically insulated and is positioned such that said second switching membrane is in contact with said second switching contact only when the gas pressure in said reference pressure chamber is at a correct or higher pressure.

5. The switch of claim 2, wherein said second switching contact is electrically insulated and positioned in said reference pressure chamber such that said second switching membrane is in contact with said second switching contact only when the gas pressure in said reference pressure chamber decreases below a correct reference gas pressure.

6. The switch of claim 5, further including a switch housing having electrically insulated duct means for guiding said first and second switching contacts through said switch housing in radial direction into said reference pressure chamber in which said switching contacts are then obliquely bent in the axial direction towards center points of said first and second switching membranes respectively.

7. The switch of claim 6, wherein said duct means are made of synthetic resin.

8. The switch of claim 6, wherein said duct means are made of ceramic material.

9. The switch of claim 5, wherein at least one of said switching contacts includes adjustment means for adjusting the gas pressure values at which said first and second switching membranes break contact with said first and second switching contacts.

10. The switch of claim 9, wherein said gas pressure values are adjusted by plastic deformation of at least one of said switching contacts.

11. The switch of claim 5, wherein at least one of said switching membranes include adjustment means for adjusting the gas pressure values at which said first and second switching membranes break contact with said first and second switching contacts.

12. The switch of claim 11, wherein said gas pressure values are adjusted by pre-stressing at least one of said switching membranes during the attaching of said switching membranes to said switch housing.

13. The switch of claim 5, further including adjusting means for adjusting the gas pressure in said reference pressure chamber.

14. The switch of claim 5, further including adjustment means for adjusting the gas pressure within the interior of said housing capsule.

15. The switch of claim 1, wherein the gas pressure in said interior space of said housing capsule is lower than the gas pressure in said reference pressure chamber.

16. The switch of claim 15, wherein said gas pressure in said interior space of said housing capsule is approximately atmospheric pressure.

17. The switch of claim 1, wherein said housing capsule is comprised of a base housing and a cap connected to each other in a pressed-fitting manner.

18. The switch of claim 17, wherein said base housing is metal.

19. The switch of claim 17, wherein at least a portion of the outer circumference of said base housing has screw threads.

20. The switch of claim 17, wherein said cap is made of synthetic resin.

21. The switch of claim 17, wherein said housing capsule is further comprised of a first sealing ring means for sealing the base housing and the cap with respect to one another.

22. The switch of claim 17, further including a safety ring means for securely clamping a switch housing into said base housing.

23. The switch of claim 17, wherein said switch housing is insulated from said base housing.

24. The switch of claim 1, further including an elastic second sealing ring means for pneumatically isolating said interior of said housing capsule from the air pressure in said tire.

25. A pneumatically operated pressure switch for monitoring the air pressure in a tire including a housing means pneumatically communicating with a filling medium of said tire, said housing mans including a reference pressure chamber filled with gas and sealed off from said filling medium, wherein said pressure switch further includes: pressure detecting means for detecting a reference gas pressure in said reference pressure chamber and indicating means for indicating when said reference gas pressure deviates from a predetermined valve, irrespective of the monitored tire air pressure.

26. The switch of claim 25, wherein said pressure detection means includes a switching means which supplies a signal to said indicating means when said switching means is closed by said deviation in reference gas pressure.

27. The switch of claim 26, wherein said switching means includes an electrically conducting switching membrane which pneumatically isolates said reference pressure chamber from an interior space of said housing means, and a switching contact which cooperates with said switching membrane to form a conductive closed path.

28. The switch of claim 27, wherein said indicating means includes an oscillating circuit.

29. The switch of claim 25, wherein said indicating means includes an oscillating circuit.

* * * * *